United States Patent
Cyman, Jr. et al.

(10) Patent No.: US 9,691,303 B2
(45) Date of Patent: Jun. 27, 2017

(54) ELECTRONIC LABEL HAVING A TIMER FUNCTION

(71) Applicant: R.R. DONNELLEY & SONS COMPANY, Chicago, IL (US)

(72) Inventors: Theodore F. Cyman, Jr., Grand Island, NY (US); Alan R. Murzynowski, Grand Island, NY (US); Daniel E. Kanfoush, Grand Island, NY (US); Eric V. Palmer, Lancaster, NY (US)

(73) Assignee: R.R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 14/853,563

(22) Filed: Sep. 14, 2015

(65) Prior Publication Data

US 2017/0076642 A1     Mar. 16, 2017

(51) Int. Cl.
*G09F 3/20* (2006.01)
*G06K 7/10* (2006.01)
*G06K 19/077* (2006.01)

(52) U.S. Cl.
CPC ......... *G09F 3/208* (2013.01); *G06K 7/10366* (2013.01); *G06K 19/07749* (2013.01)

(58) Field of Classification Search
CPC ........ G06Q 50/22; G06Q 50/24; G06Q 10/06; G06Q 10/10; G06Q 10/087; G06Q 10/109; G06Q 30/02; G06Q 30/0623; G06Q 40/08; G06Q 10/08; G06Q 10/0833
USPC ........................................................ 340/6.1
See application file for complete search history.

(56) References Cited

U.S. PATENT DOCUMENTS

| | | | |
|---|---|---|---|
| 6,019,865 A | 2/2000 | Palmer et al. | |
| 6,043,745 A | 3/2000 | Lake | |
| 6,420,096 B1 | 7/2002 | Löbl et al. | |
| 6,421,013 B1 | 7/2002 | Chung | |
| 6,886,745 B2 * | 5/2005 | Berrube | G06F 3/147 235/375 |
| 6,888,509 B2 | 5/2005 | Atherton | |
| 6,924,781 B1 * | 8/2005 | Gelbman | G06F 3/1454 340/10.6 |
| 7,042,357 B2 | 5/2006 | Girvin et al. | |
| 7,057,495 B2 * | 6/2006 | Debord | G01K 3/04 340/309.16 |
| 7,168,626 B2 | 1/2007 | Lerch et al. | |
| 7,174,277 B2 * | 2/2007 | Vock | A43B 3/0005 340/545.6 |
| 7,204,425 B2 | 4/2007 | Mosher, Jr. et al. | |

(Continued)

FOREIGN PATENT DOCUMENTS

| | | |
|---|---|---|
| JP | 2003/277653 | 10/2003 |
| WO | WO 00/73082 | 12/2000 |

(Continued)

OTHER PUBLICATIONS

U.S. Appl. No. 15/344,939, R.R. Donnelley & Sons Company.

(Continued)

*Primary Examiner* — Mark Blouin
(74) *Attorney, Agent, or Firm* — McCracken & Gillen LLC

(57) ABSTRACT

An electronic label includes a first substrate, a second substrate, and an electronic circuit disposed between the first substrate and the second substrate. A switch and an indicator are coupled to the electronic circuit. The indicator is responsive to actuation of the switch to indicate usage of a product.

20 Claims, 8 Drawing Sheets

(56) References Cited

U.S. PATENT DOCUMENTS

| | | | |
|---|---|---|---|
| 7,283,054 B2 | 10/2007 | Girvin et al. | |
| 7,295,115 B2 | 11/2007 | Aljadeff et al. | |
| 7,316,358 B2 | 1/2008 | Kotik et al. | |
| 7,377,447 B2 | 5/2008 | Oberle | |
| 7,417,541 B2 | 8/2008 | Lerch et al. | |
| 7,586,412 B2 | 9/2009 | Takatama | |
| 7,627,451 B2 | 12/2009 | Vock et al. | |
| 7,639,135 B2 | 12/2009 | Arms et al. | |
| 7,737,839 B1 | 6/2010 | Jones | |
| 7,856,339 B2 | 12/2010 | Vock et al. | |
| 8,126,675 B2 | 2/2012 | Vock et al. | |
| 8,203,446 B2 | 6/2012 | Tsubota et al. | |
| 8,219,466 B2 | 7/2012 | Gui et al. | |
| 8,280,682 B2 | 10/2012 | Vock et al. | |
| 8,317,084 B2 * | 11/2012 | Bagai | B65D 5/4216 235/375 |
| 8,354,927 B2 | 1/2013 | Breed | |
| 8,428,904 B2 | 4/2013 | Vock et al. | |
| 8,590,799 B2 | 11/2013 | Liu | |
| 8,618,914 B2 | 12/2013 | Bachman et al. | |
| 8,640,259 B2 * | 1/2014 | Jung | G06F 21/64 345/173 |
| 8,762,212 B2 * | 6/2014 | Falls | G06Q 10/087 235/383 |
| 9,030,724 B2 * | 5/2015 | Agrawal | G02F 1/1506 359/265 |
| 9,077,183 B2 | 7/2015 | Thomas et al. | |
| 9,087,318 B1 * | 7/2015 | Cordes | G06Q 10/0875 |
| 2004/0066296 A1 | 4/2004 | Atherton | |
| 2011/0131854 A1 | 6/2011 | Waltersdorf | |
| 2016/0050762 A1 | 2/2016 | Cyman, Jr. et al. | |
| 2016/0055453 A1 | 2/2016 | Cyman, Jr. et al. | |

FOREIGN PATENT DOCUMENTS

| | | |
|---|---|---|
| WO | WO 03/006736 | 1/2003 |
| WO | WO 2014/067578 | 5/2014 |

OTHER PUBLICATIONS

U.S. Appl. No. 15/043,885, R.R. Donnelley & Sons Company.
U.S. Appl. No. 14/996,413, R.R. Donnelley & Sons Company.
International Search Report and Written Opinion dated Nov. 25, 2015, for International Application No. PCT/US2015/045922, Applicant R.R. Donnelley & Sons Company (11 pages).
International Search Report and Written Opinion dated Oct. 8, 2015, for International Application No. PCT/US2015/045089, Applicant, R.R. Donnelley & Sons Company (10 Pages).
International Search Report and Written Opinion dated Oct. 20, 2015, for International Application No. PCT/US2015/045128, Applicant, R.R. Donnelley & Sons Company (10 Pages).

* cited by examiner

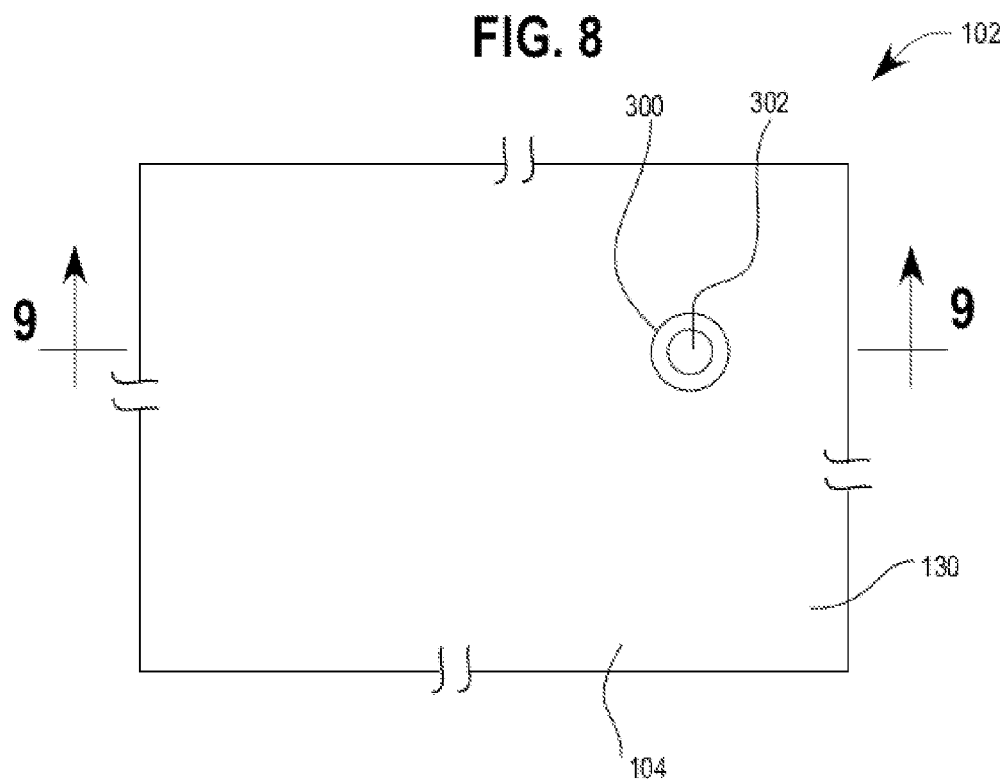
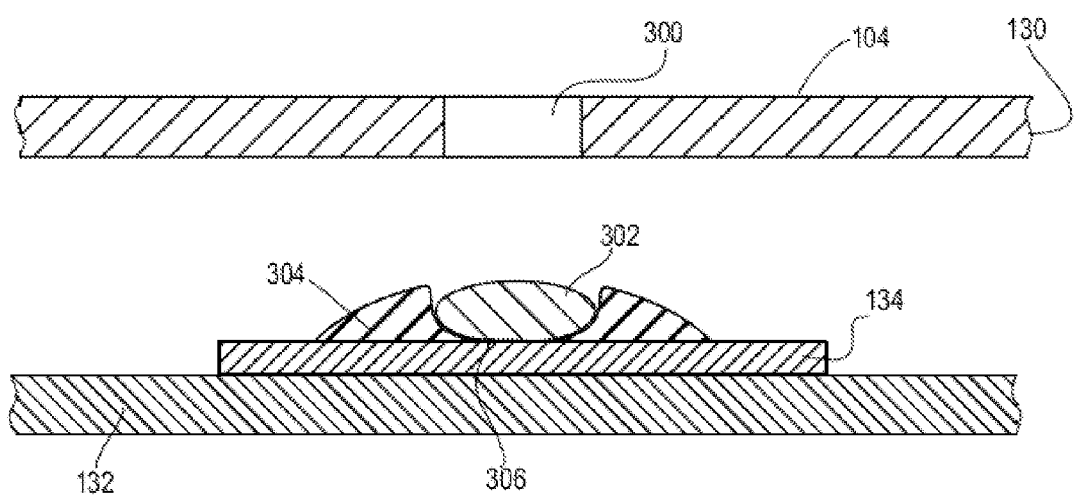

ELECTRONIC LABEL HAVING A TIMER FUNCTION

FIELD OF DISCLOSURE

The present subject matter relates to an electronic label, and more particularly, to an electronic label having a timer function.

BACKGROUND

Activities may be undertaken at periodic intervals and/or for a predetermined duration, whether in accordance with a schedule or as desired. In addition, certain foods, for example, eggs or rice are cooked for a designated amount of time to be optimal. Similarly, teeth whiteners or hair dyes are applied for a predetermined amount of time to be effective, or may need to be applied periodically to maintain efficacy. Certain activities, for example, exercise may be undertaken for a predetermined minimum amount of time to be effective. The efficacy of a medication typically depends on a patient adhering to the dosage and frequency requirements of the medication.

Further, certain activities undertaken more often than recommended may produce unwanted effects. For example, undertaking certain exercises for prolonged periods or more often than recommended may lead to injuries. Certain medications, if consumed more often than prescribed, may produce serious complications and in some cases such complications may be more severe than the condition such medication is prescribed to treat.

For prescription medication, a physician typically advises an individual with information regarding how often a medication is to be consumed. In addition, information regarding how often to consume the medication and the dosage to consume may be printed on a label that accompanies the medication. Similarly, instructions associated with other products or activities may include information about how often such product is to be consumed or activity is to be undertaken.

Even when such instructions are provided, the individual is still responsible for tracking when a dose of the medication has been consumed, a product has been utilized, and/or an activity has been undertaken. Further, the individual may need to track when to consume the next dose of the medication, or utilize the product and/or undertake the activity again. Such tracking may be particularly difficult if the memory of the patient is compromised, if the medication or product is not to be consumed or used, or the activity undertaken everyday or at regular intervals.

SUMMARY

According to one aspect, an electronic label includes a first substrate, a second substrate, and an electronic circuit disposed between the first substrate and the second substrate. A switch, a processor, and an indicator are coupled to the electronic circuit. The switch is adapted to be manually actuated, and in response to each of a plurality of actuations, the processor determines whether to actuate the indicator to indicate if at least a predetermined amount of time has elapsed.

BRIEF DESCRIPTION OF THE DRAWINGS

FIG. 8 is a plan view of a portion of the label of FIGS. 1 and 2;

FIG. 9 is a an exploded fragmentary cross-sectional view taken along a line 9-9 of FIG. 8 of the electronic label of FIGS. 1 and 2.

DETAILED DESCRIPTION

Figure 1A:
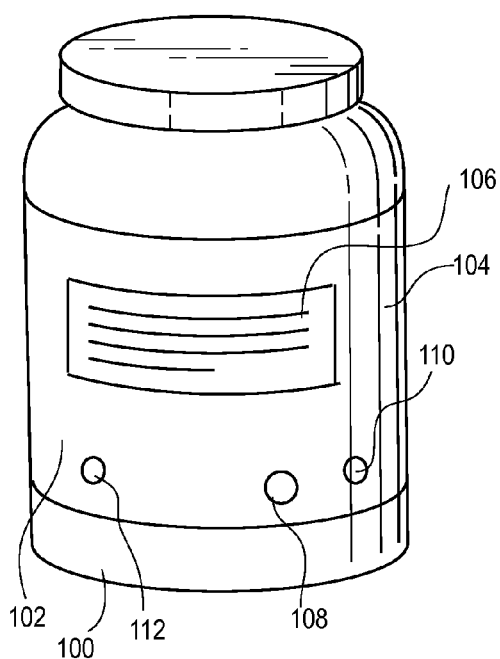
FIGS. 1A and 1B are isometric views of an electronic label secured to a container.
Figure 1B:
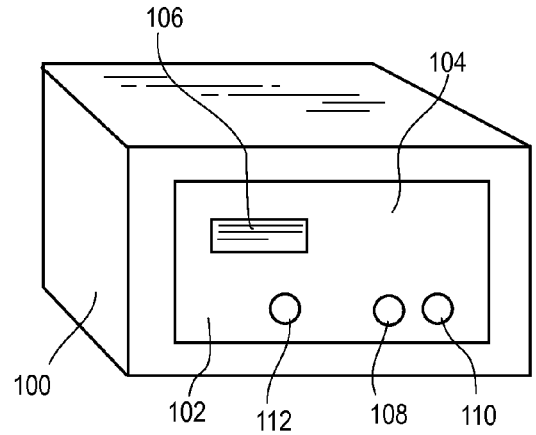

Referring to FIGS. 1A and 1B, a container 100, for example a container for a consumable product, has an electronic label 102 affixed thereto. A front face 104 of the electronic label 102 may include one or more portions 106 in which information regarding the contents of the container 100 may be printed. Further, the electronic label 102 may include a first button or switch 108, one or more indicator(s) 110, and a second button or switch 112. The electronic label 102 is preferably made of flexible layers that are adhered or otherwise bonded together to form a flexible substantially flat member.

Figure 2:
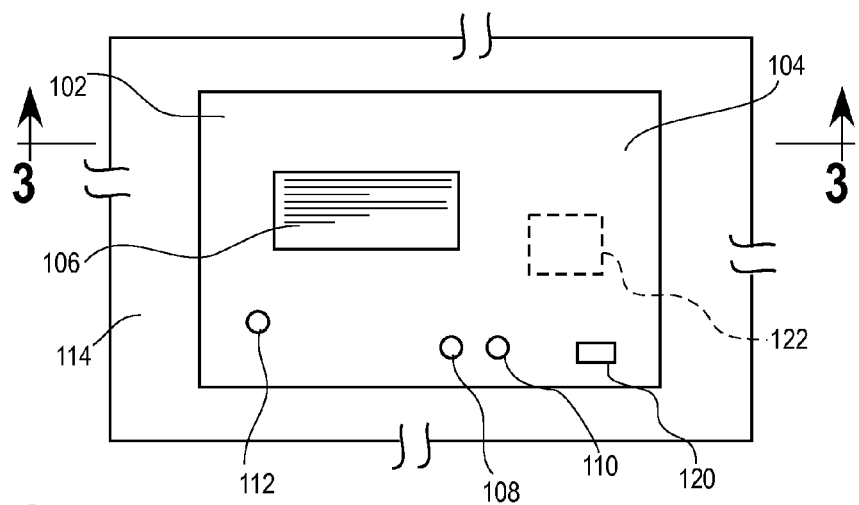
FIG. 2 is a plan view of the electronic label of FIG. 1 secured to a surface.

In some embodiments, the electronic label 102 may include a releasable adhesive deposited on a rear face (not shown) thereof to secure the electronic label 102 to the container 100. Referring to FIG. 2, such electronic label 102 may be removed from the container 100 and affixed to another surface 114. For example, the user may wish to remove the electronic label 102 from the container 100 and secure the electronic label 102 to a surface 114 convenient to the user such as, for example, a surface of a vanity mirror, a bulletin board, a cabinet, and/or the like. Further, the releasable adhesive on the rear face of the electronic label 102 may secure the label to the surface 114, or another adhesive or securing apparatus available to the user may be used to secure the electronic label 102 to the surface 114. The presence of the electronic label 102 may serve as a reminder to the user to check whether a product associated with the electronic label 102 is to be consumed or used. In some embodiments, another label (not shown) may be affixed to the container 100 that remains even after the electronic label 102 is removed. In such embodiments, such additional label may identify the contents of the container, the quantity of such contents to be consumed, and the frequency such with which such product should be consumed.

In some embodiments, the electronic label 102 may be provided without a container. For example, if the electronic label 102 is for use with an activity that does not require any additional product to undertake.

In some embodiments, the electronic label 102 may incorporate a data port 120 that may be used to download into a memory (FIG. 4A, 154) of the electronic label 102, configuration information regarding when the product associated with the electronic label 102 is to be consumed. In other embodiments, the electronic label 102 may include a Radio Frequency Identification (RFID) circuit 122 that may be used to download such frequency information into the memory (FIG. 4A, 154) of the electronic label 102. Other ways of the downloading digital data into the memory (FIG. 4A, 154) of the electronic label 102 apparent to those of ordinary skill in the art may be used.

In operation, the configuration information regarding the quantity and/or frequency with which the product associated with the electronic label 102 is to be consumed may be downloaded into the electronic label 102 by a manufacturer of the electronic label 102, a manufacturer of the product associated with the electronic label 102, a seller or supplier of the product, and/or a seller or supplier of the electronic label 102.

The configuration information may include, for example, a minimum amount of time that should elapse between consumption of units of the product. Such time may be a constant such as 12 hours, 1 day, 3 days, and the like. Alternately, such time may vary and indicate that a second unit should be consumed after at least 12 hours have passed after a first unit is taken, and a third unit should be consumed at least 24 hours after the second does is taken, and so on. It should be apparent that the configuration information may include the minimum amount of time that should elapse between undertaking amounts of an activity.

Further, the configuration information may include the size of each unit of the product or the amount (e.g., time to spend) on the activity. For example, the size of each unit to be consumed may be represented as a quantity associated with each such unit (e.g., tablets, milliliters, and the like) of the product to be consumed. Such size may be identical each time the unit of the product is consumed, and the configuration information may indicate, for example, that each unit is one tablet. Alternately, the configuration information may indicate that the size of each unit varies and, for example, the first unit to consume is five tablets, the second unit is three tablets, and each of the remaining units is one tablet. The configuration information may also include the number of units of the product that are dispensed with the electronic label 102.

Similarly, the configuration information may include a unit of an activity undertaken, and such unit may be represented, for example, as time spent on the activity or a number of repetitions of the activity to undertake.

In some embodiments, the seller of the product may activate the electronic label 102 just prior to when the product and the electronic label 102 are provided to the user. Such activation may be undertaken by transmitting data that represents activation of the electronic label 102 via, for example, the data port 120 or the RFID circuit 122. Alternately, such activation may be undertaken by pressing either one or both the first button 108 and the second button 112 in a predetermined sequence. As examples, such activation may be undertaken by pressing the first button 108 in rapid succession a predetermined number of times, pressing the second button 112 in rapid succession a predetermined number of times, pressing the first button 108 and the second button 112 simultaneously, pressing and holding the first button 108 for a predetermined length of time, pressing and holding the second button 112 for a predetermined length of time, and the like.

In some cases, the user may be instructed to activate the electronic label 102 as described above, before or just after consuming the first unit of a product or undertaking an activity a first time.

In one embodiment, the indicator(s) 110 may include a light-emitting device, such as a light emitting diode (LED). If the user presses the first button 108 after the configuration information has been transmitted to the electronic label 102, and the electronic label 102 has been activated, the light-emitting device may emit light only if it is time to take a unit of the product or undertake an amount of the activity as specified by the configuration information. In some cases, the light-emitting device may display a solid light for a predetermined amount of time in response to the user pressing the first button 108 if it is time to take a unit of the product, and alternatively may display a flashing light for a predetermined amount of time if it is not yet time to take such unit.

In another embodiment, the indicator(s) 110 may include a device that can display either numeric, alphabetic, and/or alphanumeric characters. Such device may include a seven-segment LED, a liquid crystal device, a plurality of individual LEDs, an organic light-emitting display (OLED), and/or the like. In such embodiment, when the first button 108 is pressed, the indicator(s) 110 may indicate how much time remains before the next unit of the product is to be taken, the product is to be used, an amount of an activity is to be undertaken. In some cases, the indicator(s) 110 may also indicate the number of units of the product that should be taken the next time.

In some embodiments, the indicator(s) 110 may include an audio emitting device and/or a vibration device that is actuated when the product is to be used or taken, or an activity is to be performed. Such audio device and/or vibration device may be in addition to or instead of a light-emitting device. For example, such audio emitting device or vibration device may be actuated for a predetermined amount of time when the user presses the first button 108 and if a unit of the product is to be taken, the product is to be used, or the activity performed. In some cases, the indicator(s) 110, the audio device, and/or the vibration device may be actuated periodically when the unit of the product is to be taken, the product used or the activity performed, without requiring the user to press the first button 108.

After the user takes a unit of the product, uses the product, or performs the activity, the second button 112 may be actuated to record in the electronic label 102 that the product has been consumed or used, or activity performed. Alternately, the electronic label 102 may not include a second button 112, and any other manner of indicating that the product has been consumed or activity undertaken may be employed. Thus, for example, the first button 108 may be pressed in succession or for a predetermined amount of time to indicate that the product has been consumed.

The electronic label 102 may be operated in the manner described above until all of the units of the product associated with the electronic label 102 have been consumed. Further, in some embodiments, when a further quantity of the product is provided to the user, for example, when product associated with the electronic label 102 is refilled, the electronic label 102 may be reused with such refill by resetting the electronic label 102. Such reset may be accomplished, for example, by again undertaking activation the electronic label 102 as described above.

Figure 3:
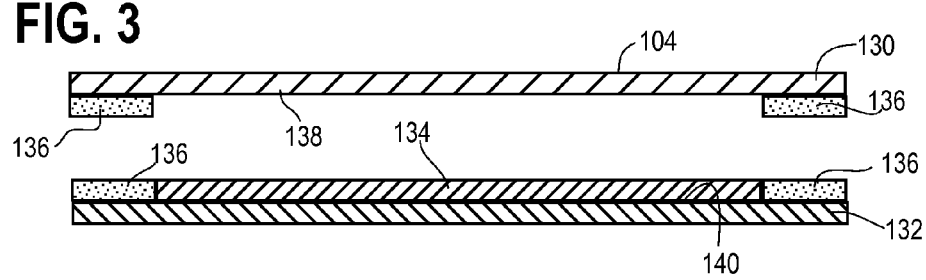
FIG. 3 is a partially exploded sectional view taken along a line 3-3 of the electronic label of FIG. 2.

Referring to FIG. 3, the electronic label 102 may include a first substrate 130 and a second substrate 132, an electronic circuit 134 disposed between the first substrate 130 and the second substrate 132, and an adhesive 136 that secures an inner face 138 of the first substrate 130 to an inner face 140 of the second substrate 132.

The first substrate 130 and the second substrate 132 may comprise coated or uncoated paper, textiles, woven materials, plastic, films, gels, epoxies, fiberglass, and combinations thereof. Further, the substrates 130,132 that comprise the electronic label 102 may be manufactured from identical or different materials.

The first substrate 130 and the second substrate 132 are secured to one another such that the electronic circuit 134 may be supported therebetween. In some embodiments, the electronic circuit 134 may include conductive traces deposited on the inner face 138 of the first substrate 130, or the inner face 140 of the second substrate 132. In other embodiments, the electronic circuit 134 may include a first conductive trace deposited on the inner face 138 of the first substrate 130 and a second conductive trace deposited on the inner face 140 of the second substrate 132. In some embodiments, such conductive traces, or a portion thereof, may be applied on the inner faces 138, 140 using a printing process such as, for example, lithography, gravure, flexography, inkjet, foil transfer, and a combination thereof. In other embodiments, the electronic circuit 134, or a portion thereof, may be applied to a carrier separate from the first substrate 130 and the second substrate 132 that is deposited on and/or secured to the inner faces 138, 140. The electronic circuit 134 also may include electronic components deposited and secured to the conductive traces thereof. Other ways of disposing the electronic circuit 134 between the first substrate 130 and the second substrate 132 apparent to those who have ordinary skill in the art may be used.

Figure 4A:
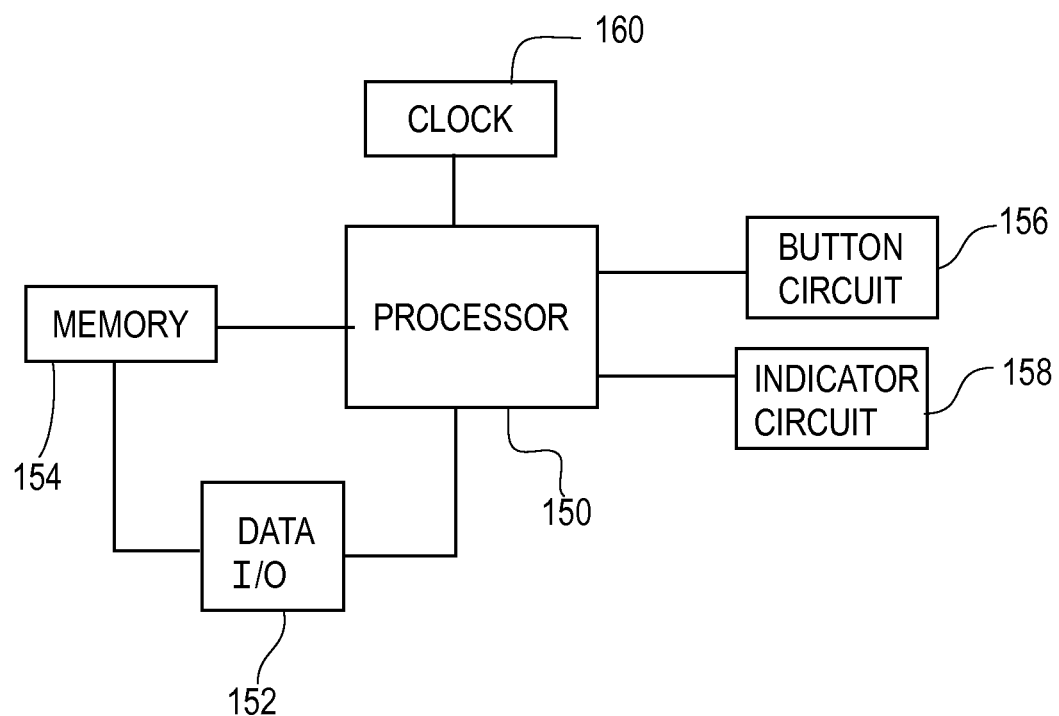
FIG. 4A is a block diagram of an electronic circuit of the electronic label of FIGS. 1 and 2.
Figure 4B:
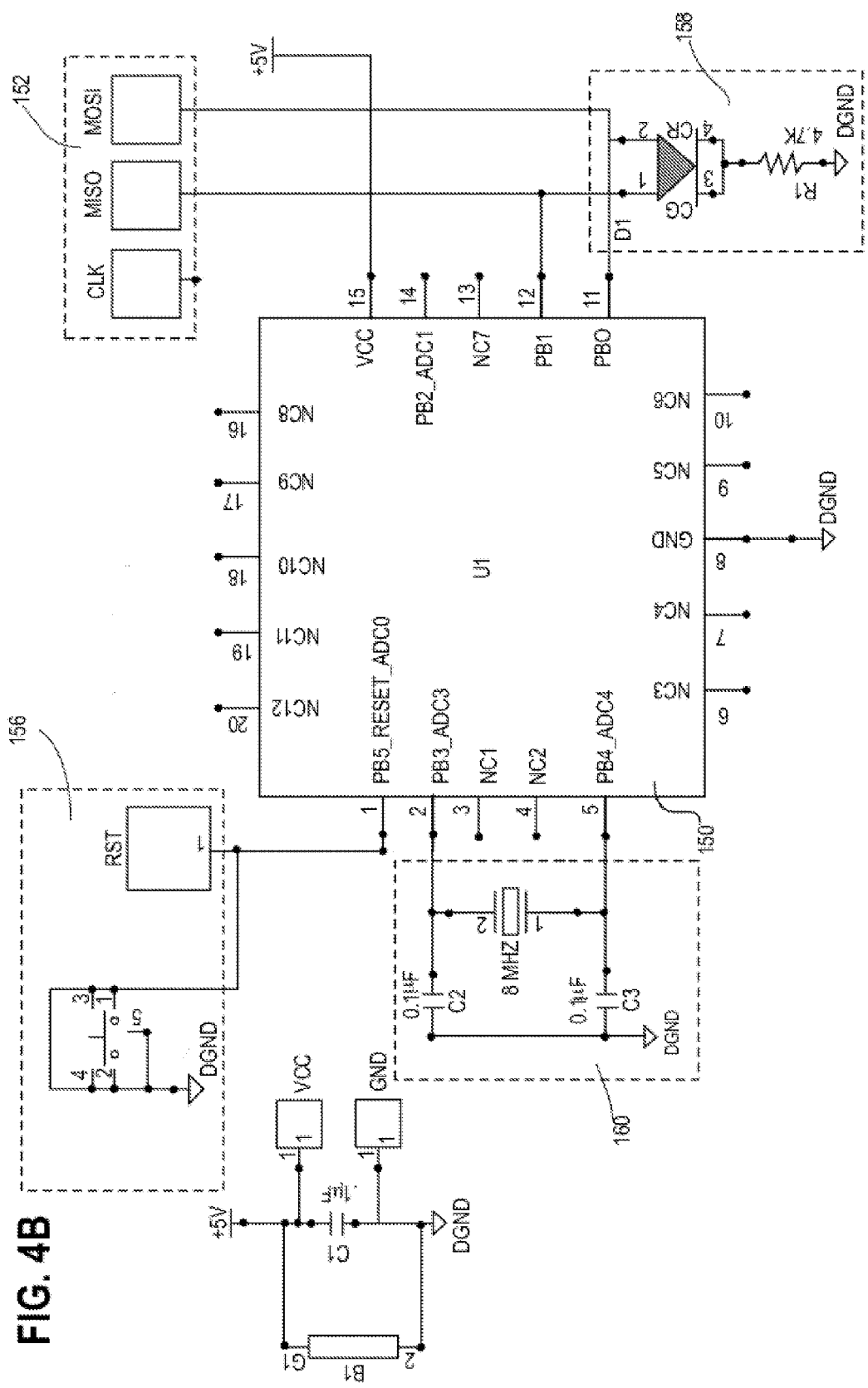
FIG. 4B is a combined block and schematic diagram of an electronic circuit of the electronic label of FIGS. 1 and 2.

Referring to FIGS. 4A and 4B, one embodiment of the electronic circuit 134 may include a processor 150, a data input-output circuit 152, a memory 154, a button circuit 156, and an indicator circuit 158. In some embodiments, the processor 150, the data input-output circuit 152, and the memory 154 are configured to transfer data therebetween. For example, the data input-output circuit 152 may receive data from an external device (not shown) and directly write data to the memory 154, which may then be accessible the processor 150. Similarly, the processor 150 may write data to the memory 154 that is thereafter accessible by an external reading device (not shown) via the data input-output circuit 152.

The button circuit 156 may include the components necessary to implement the first button 108 and the second button 112 described above.

The indicator circuit 158 may include one or more visual, aural, and/or physical indicator(s) 110 including, for example, light emitters, sound emitters, and/or vibration generators, and driver electronics controlled by the processor 150 to actuate such indicator(s) 110.

In some embodiments, the data input-output circuit 152 includes one or more of a Serial-Peripheral Interface (SPI) interface or port, a Universal Serial Bus port, a radio frequency identification (RFID) transceiver, a radio transceiver that operated in accordance with Bluetooth or 802.11 wireless communications protocols, and the like.

As described above, the configuration information may be transmitted to the data input-output circuit 152 using an appropriate communication device (not shown). The data input-output circuit 152 may directly store such configuration information in the memory 154 or provide such configuration information to the processor 150, which stores the configuration information in the memory 154.

Figure 5:
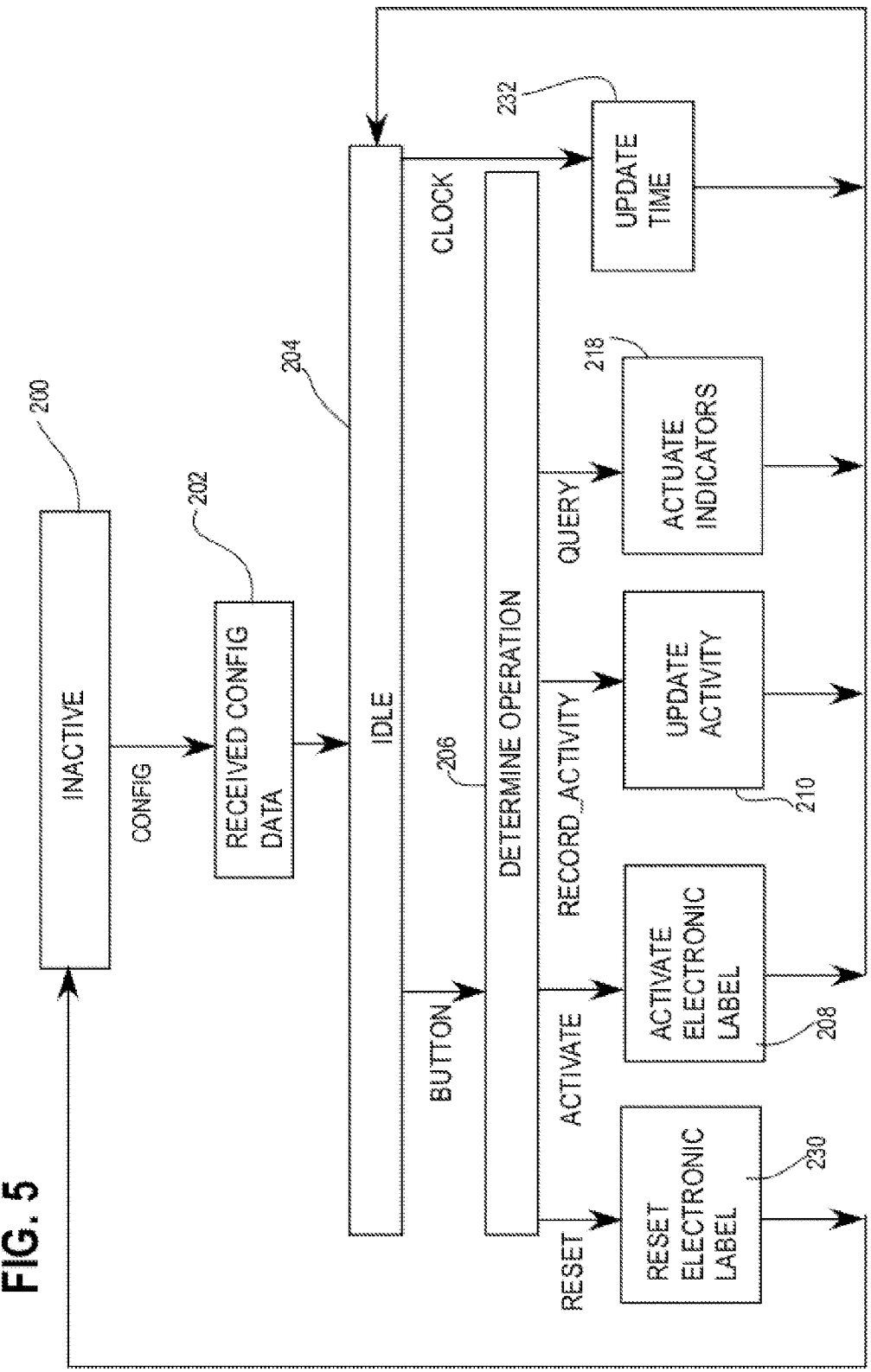
FIG. 5 is a state diagram of operation of a processor of the electronic label of FIGS. 1 and 2.

Referring now to FIGS. 4 and 5, in one embodiment of the electronic label 102 associated with an activity, the processor 150 initially operates in an inactive state 200 during which the processor 150 is in a low power state and undertakes only minimal activity. It should be apparent that the activity associated with the electronic label 102 may include consuming a unit of the product, using a unit of the product, or undertaking some other activity not associated with a product.

If during the inactive state 200, the processor 150 receives an indication that configuration data are available, the processor 150 transitions to a receive configuration data state 202. In some cases, the data input-output circuit 152 generates a signal sensed by the processor 150 that indicates that configuration data are available when configuration data are transmitted thereto.

In the receive configuration data state 202, the processor 150 receives the configuration data, validates the configuration data, and stores the configuration data in the memory 154. In some embodiments, the processor 150 may receive the configuration data and store such data in the memory 154. In other embodiments, the data input-output circuit 152 may receive the configuration data, store the configuration data in the memory 154, and then generate a signal to the processor 150 that the data are available, and the processor 150 transitions from the inactive state 200 to the receive configuration data state 202 in response to such signal.

In some embodiments, the processor 150 may actuate one or more indicator(s) 110 to indicate whether valid configuration data were received and stored in the memory 154. When in the receive configuration data state 202, if the processor 150 determines that the data are not valid, the processor 150 returns to the inactive state 200. Otherwise, the processor 150 transitions to an idle state 204. Like the inactive state 200, the idle state 204 is a low power state. If the button circuit 156 detects a button press, the processor 150 transitions to a determine operation state 206. In the determine operation state 206, the processor 150 determines whether the first button 108, the second button 112, or a combination thereof was pressed, and if such buttons 108, 112 were pressed multiple times and or in a particular sequence within a predetermined duration. The processor 150 thus determines if the button press or sequence of button presses correspond to one of an activate command, a query command, a record activity command, and a reset command.

If the button presses correspond to an activate command, the processor 150 transitions to an activate electronic label state 208. In the activate electronic label state 208, the processor 150 sets a value of a variable activityCount to zero, sets a value of a variable labelActivated to true, sets internal interrupts to respond to an interrupt (or tick) generated by the clock 160, and transitions to the idle state 204.

Figure 6:
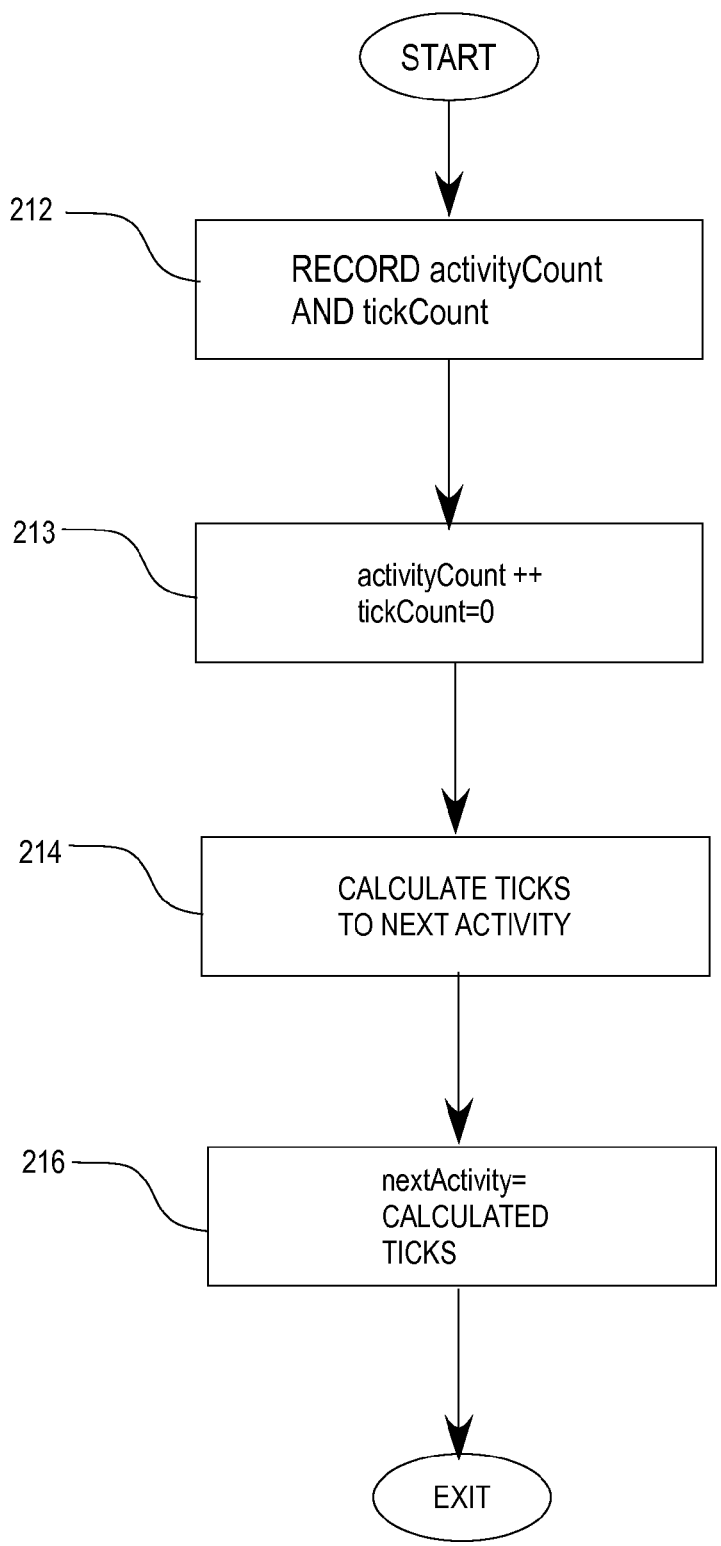
FIGS. 6 and 7 are flowcharts of operations undertaken by the processor of the electronic label of FIGS. 1 and 2.

While in the determine operation state 206, if the processor 150 determines that the button press or presses correspond to a record activity command, the processor 150 transitions to an update activity state 210. Referring also to FIG. 6, in the update activity state 210, block 212, the processor 150 records the values of variables activityCount and tickCount in the memory 154. If this is the first time the activity is being undertaken, then the values of these variables may be zero. Then, at block 213, the processor 150 sets the value of the variable tickCount to zero, and increments the value of the variable activityCount by one. Thereafter, at block 214, the processor 150 calculates the number of ticks that have to be received by the processor 150 from the clock 160 before a next time when the activity is to be undertaken. For example, if in accordance with the configuration data, twelve hours must elapse before the next activity should be undertaken and if the clock 160 generates a tick every millisecond, then at least 43,200,000 ticks must be received from the clock 160 before the next time the activity is due. At block 216, the processor 150 sets a value of a variable nextActivity to the number of ticks calculated. Thereafter, the processor 150 transitions to the idle state 204. It should be apparent that the variables tickCount and nextActivity may each include multiple counters. For example, one counter may count the number of ticks up to the number of ticks in 24 hours, and another counter may count the number of 24-hour periods. The storage of the variables tickCount and nextActivity may be organized in other ways that may be apparent to those of skill in the art may be used so that these variables can accommodate the number of ticks that must elapse between activities undertaken.

Figure 7:
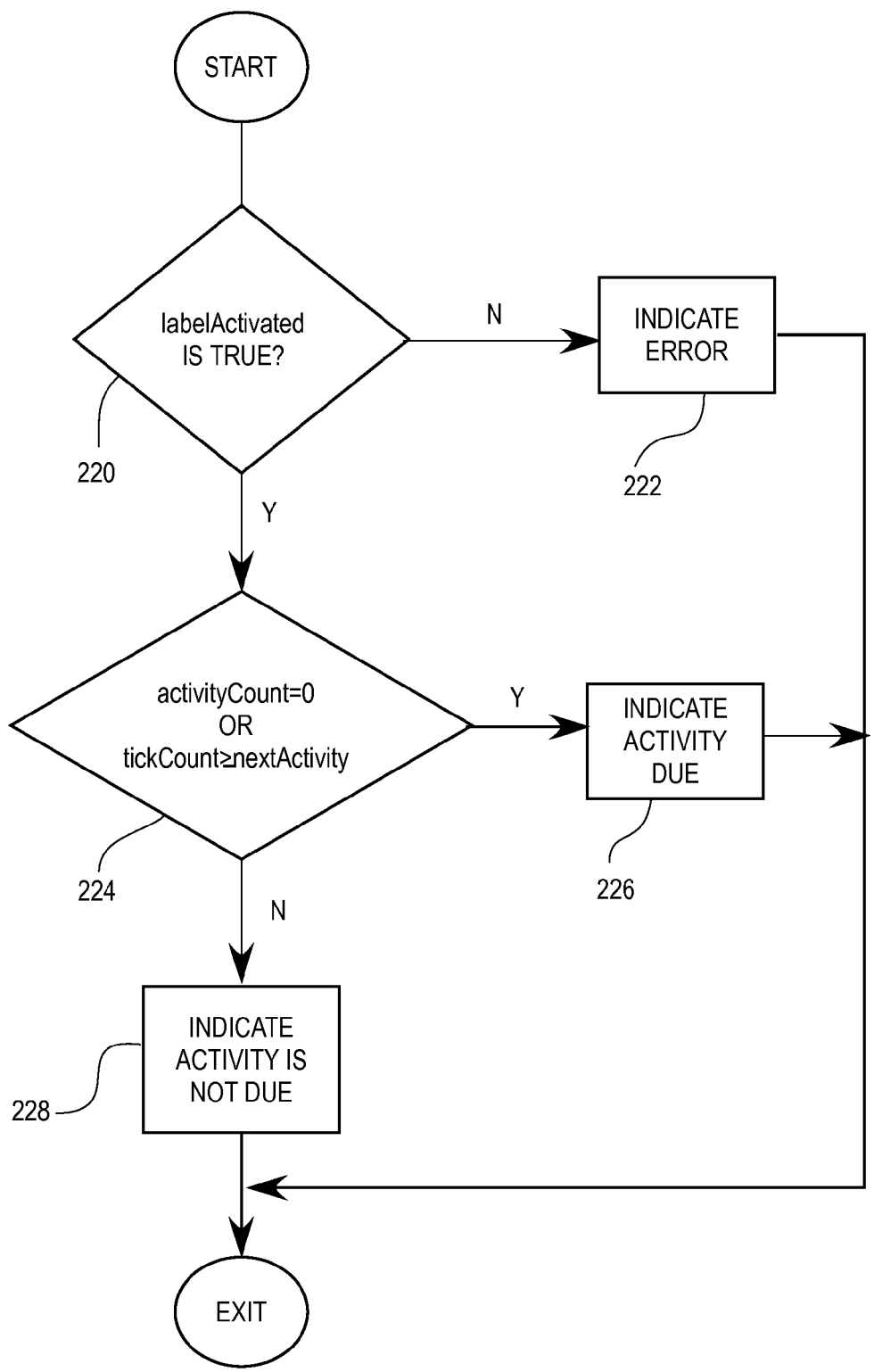

Returning to FIG. 5, if in the determine operation state 206, the processor 150 determines that the button presses correspond to a query command, the processor 150 transitions to an actuate indicators state 218. Referring also to FIG. 7, in the actuate indicators state 218, the processor 150 determines, if the value of the variable labelActivated is true, at block 220. If the value of such variable is not true, the processor 150 directs the indicator circuit 158 to actuate the indicator(s) 110 to indicate an error, at block 222, and returns to the idle state 204.

If at block 220, the value of the variable labelActivated is true, the processor 150, at block 224, determines if the value of the variable activityCount is zero (i.e., no activity has been undertaken yet) or if the value of the variable tickCount is greater than or equal to the value of the variable nextActivity. If so, the processor 150 proceeds to block 226, otherwise the processor 150 proceeds to block 228.

At block 226, the processor 150 directs the indicator circuit 158 to actuate the indicator(s) 110 to generate a predetermined indication that activity is due to be undertaken, and returns to the idle state 204.

At block 228, in some embodiments, the processor 150 may direct the indicator circuit 158 to actuate the indicator (s) 110 in turn to generate a predetermined indication no activity is due or an indication of how long before the next time the activity is to be undertaken, and transitions to the idle state 204. In other embodiments, the processor may not do anything at block 228 and just transition to the idle state 204.

Returning to FIG. 5, if in the determine operation state 206, the processor 150 determines that the button press(es) correspond to a reset command, the processor 150 transitions to reset electronic label state 230, sets the value of the labelActivated variable to false, and clears (or zeros) the values of one or more of the variables tickCount, activityCount, and nextActivity. In some embodiments, the processor 150 may clear the configuration data stored and/or the history stored in the memory 154. Further, the processor 150 may configure itself to ignore interrupts from the clock 160 or configure the clock 160 not to generate such interrupts. Thereafter, the processor 150 transitions to the inactive state 200. After such reset of the electronic label 102, the electronic label 102 may be reused, for example, with a refill of the product associated with the electronic label or with a different activity.

If, when the processor 150 is in the idle state 204, the clock 160 generates an interrupt or a tick, the processor 150 transitions to an update time state 232. In the update time state the processor 150 increments the value of the variable tickCount by one. In addition, in some embodiments, the processor 150 may determine if the value of the variable tickCount is greater than the value of the variable nextActivity, and if so, the processor 150 may direct the indicator circuit 158 to actuate the indicator(s) 110 to generate an indication that the activity is due. Thereafter, the processor 150 returns to the idle state 204.

Instructions executed by the processor 150 to undertake the actions during the states described above may be stored in a non-transient memory internal to the processor 150 or in a predetermined segment of the memory 154 reserved for program instructions. Such memory may also include default or predetermined configuration information that may be used if additional or different configuration information is not supplied to the electronic label 102. The electronic label 102 may comprise a programmable element, discrete components, firmware, or a combination thereof and the functions undertaken by the processor 150 may be implemented by programming and/or by hardware and/or firmware as desired. In some embodiments, the processor 150, and memory in which to store instructions executed by such processor 150 to operate the electronic label 102, may be provided by an individual component such as an application-specific integrated circuit (ASIC), a field-programmable gate array (FPGA), a discrete logic device, a state machine, and the like.

Referring to FIGS. 4A and 4B, the memory 154 may be queried by a reading device that communicates using the data input-output circuit 152, such as, for example, an RFID reader or a programming device. Because the processor 150 at block 212, FIG. 6, records the values of the variables activityCount and tickCount in the memory 154 each time an activity is undertaken, such recorded information may be retrieved from the memory 154 to determine how regularly the user undertook the activity associated with the electronic label 102. If such activity is consuming doses of a medication, a physician, for example, may use such a history of such activity (i.e., dose consumption) that shows the elapsed time between doses to assess the effectiveness of a medication, or how well the user has followed a treatment plan.

In some embodiments, if an LED or other light source comprises the indicator(s) 110, sufficient light from such LED may not project outwardly from the front face 104 of the electronic label 102 to be apparent under all viewing conditions. Referring to FIGS. 3, 8 and 9, the first substrate 130 may include an orifice 300 through which light emitted by an LED 302 passes. The LED 302 may be coupled to the electronic circuit 134 deposited on the second substrate 132 of the electronic label 102. In some embodiments, to prevent light emitted by the LED from diffusing laterally within the first substrate 130, the second substrate 132, and/or therebetween, a carrier or channel 304 may be formed into which the LED 302 may be disposed. In some embodiments, the carrier 304 directs light emitted by the LED 302 outwardly through the orifice 300. In other embodiments, the light emitted by the LED 302 may scatter within the carrier and appear as a spot of light larger the LED.

In some embodiments, the carrier 304 may be formed from one of a polymer, a resin, a plastic, and the like. The carrier 304 may be formed in situ on the second substrate 132, for example, by inkjet printing, lithography, flexography, and/or gravure printing such material. Such channels may also be formed by depositing a plastic material (e.g., ABS), in a 3-dimensional deposition or lamination process. In some embodiments, the carrier 304 may be formed separately and adhered to the second substrate 132. If the carrier 304 is disposed on top of the electronic circuit 134 on the second substrate 132, the carrier may have one or more orifices or vias 306 through which the pins of the LED 302 may contact the conductive traces of the electronic circuit 134.

Figure 10:
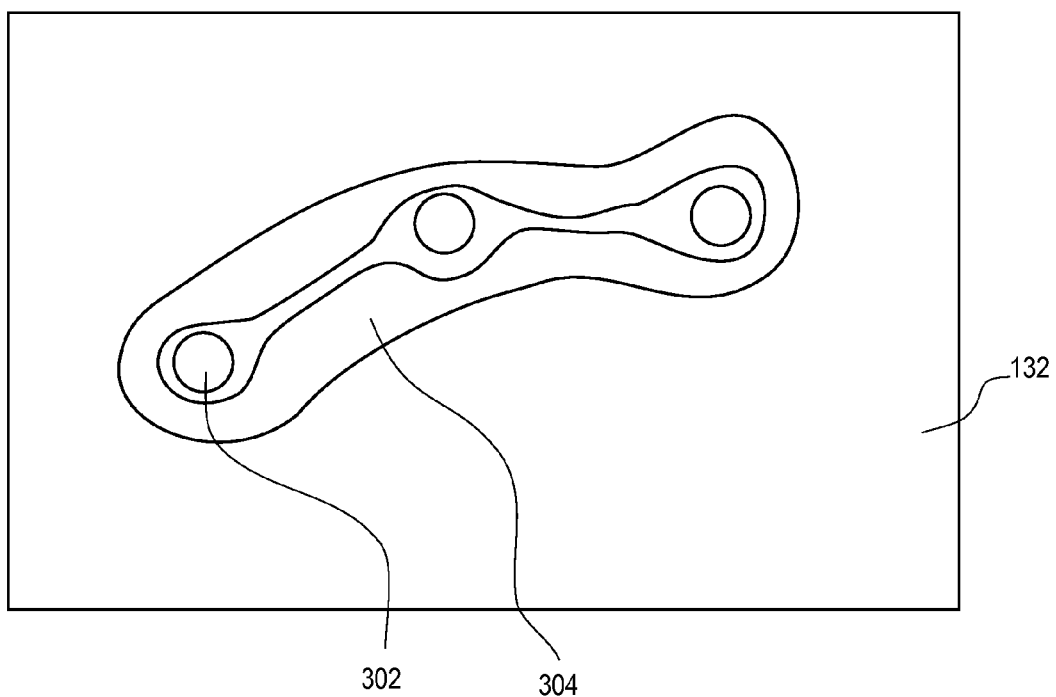
FIG. 10 is a plan view of an interior portion of the electronic label of FIGS. 1 and 2.

Referring to FIG. 10, in some embodiments, the carrier 304 may be formed as a shape that is lit by one or more LEDs 302. For example, if the carrier 304 is a material in which light scatters, then when the LEDs 302 are actuated, the light emitted by such LEDs 302 scatters throughout the carrier 304 and causes the shape represented by the carrier 304 to be apparent through the first substrate 130.

The carrier 304 may have one or more orifices or vias 306 therethrough, and the LEDs 302 may be disposed on the carrier 304 such that the pins of the LEDs 302 pass through such vias and contact conductive traces of the electronic circuit 134.

It should be apparent that carrier 304 for diffusing light may be used in other electronic label applications or products, not only electronic label associated with dispensed medicines. For example, such products may include greeting cards, books, advertising or information labels, and the like.

In some embodiments, the electronic label 102 may be configured to operate as a timer. In one embodiment, the electronic label 102 may be configured to actuate one or more indicators 110 after a predetermined amount of time has elapsed after pressing a predetermined combination of buttons or switches 108,112. In another embodiment, each press of, for example, the first button 108 may increment an amount of time that must elapse before the indicators 110 are actuated. For example, each press may add one minute to such amount of time. Then, pressing the second button 112 may start the timer. Thereafter, one or more of the indicators 110 may be actuated after the amount of time configured using the first button 108 elapses. The timing capabilities of the electronic 102 may be used for other applications apparent to those who have skill in the art.

INDUSTRIAL APPLICABILITY

In summary, it should be apparent that the electronic label 102 described above may be used for any application in which activities need to be undertaken at predetermined intervals or on a particular schedule. Further, as noted above, some features of the electronic label 102, for example, such as the carrier to direct illumination by a light source, may have applications in products other than electronic labels.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. An electronic label, comprising:
   a first substrate;
   a second substrate;
   an electronic circuit disposed between the first substrate and the second substrate;
   a switch coupled to the electronic circuit;
   a processor coupled to the electronic circuit;
   and an indicator coupled to the electronic circuit;
   wherein the switch is adapted to be manually actuated, and in response to each of a plurality of actuations, the processor determines whether to actuate the indicator to indicate if at least a predetermined amount of time has elapsed.

2. The electronic label of claim 1, in combination with a container of a product.

3. The electronic label of claim 1, wherein at least one of the first substrate and the second substrate is flexible.

4. The electronic label of claim 1, wherein the switch includes a first switch and the electronic label further includes a second switch, wherein actuation of the first switch causes the processor to actuate the indicator only if at least the predetermined amount of time has elapsed since actuation of the second switch.

5. The electronic label of claim 4, wherein first and second sequential actuations of the first switch causes the processor to actuate the indicator after the second actuation of the first switch only if the second switch has been actuated after the first actuation of the first switch and a further predetermined amount of time has elapsed since actuation of the second switch, wherein the further predetermined amount of time is different than the predetermined amount of time.

6. The electronic label of claim 2, further including a memory, and information regarding usage of the product is stored in the memory and a data input-output circuit that may be used to store information in the memory and retrieve information stored in the memory.

7. The electronic label of claim 6, wherein a history that includes a sequence of use of the product and an elapsed time between consecutive uses of the product is stored in the memory.

8. The electronic label of claim 7, wherein the data input-output circuit retrieves the history.

9. The electronic label of claim 6, wherein the data input-output circuit includes a radio frequency identification circuit.

10. The electronic label of claim 1, further including means for securing one of the first and second substrates to a structure.

11. The electronic label of claim 1, wherein the indicator includes one of a light emitting device, a sound generator, and a vibration generator.

12. The electronic label of claim 1, further including a channel formed on a surface of the second substrate, wherein a conductive trace of the electronic circuit is disposed on the surface, the indicator is a light emitting device, and the indicator is disposed in the channel.

13. The electronic label of claim 12, wherein the conductive trace is disposed between the second substrate and the channel, and a conductor of the light-emitting device is coupled to the conductive trace.

14. The electronic label of claim 13, wherein the conductor of the light-emitting device is coupled to the conductive trace through a via in the channel.

15. The electronic label of claim 12, wherein the channel is formed from one of a polymer, a resin, and a plastic.

16. The electronic label of claim 12, wherein the channel is adapted to scatter the light emitted by the indicator.

17. The electronic label of the claim 12, wherein the channel is adapted to reflect light emitted by the indicator toward the first substrate.

18. The electronic label of claim 12, including a further indicator disposed in the channel.

19. The electronic label of claim 12, wherein at least a portion of the channel is disposed between the light-emitting device and the second substrate.

20. The electronic label of claim 1, wherein the switch comprises a button.

* * * * *